United States Patent Office 3,000,179
Patented Sept. 19, 1961

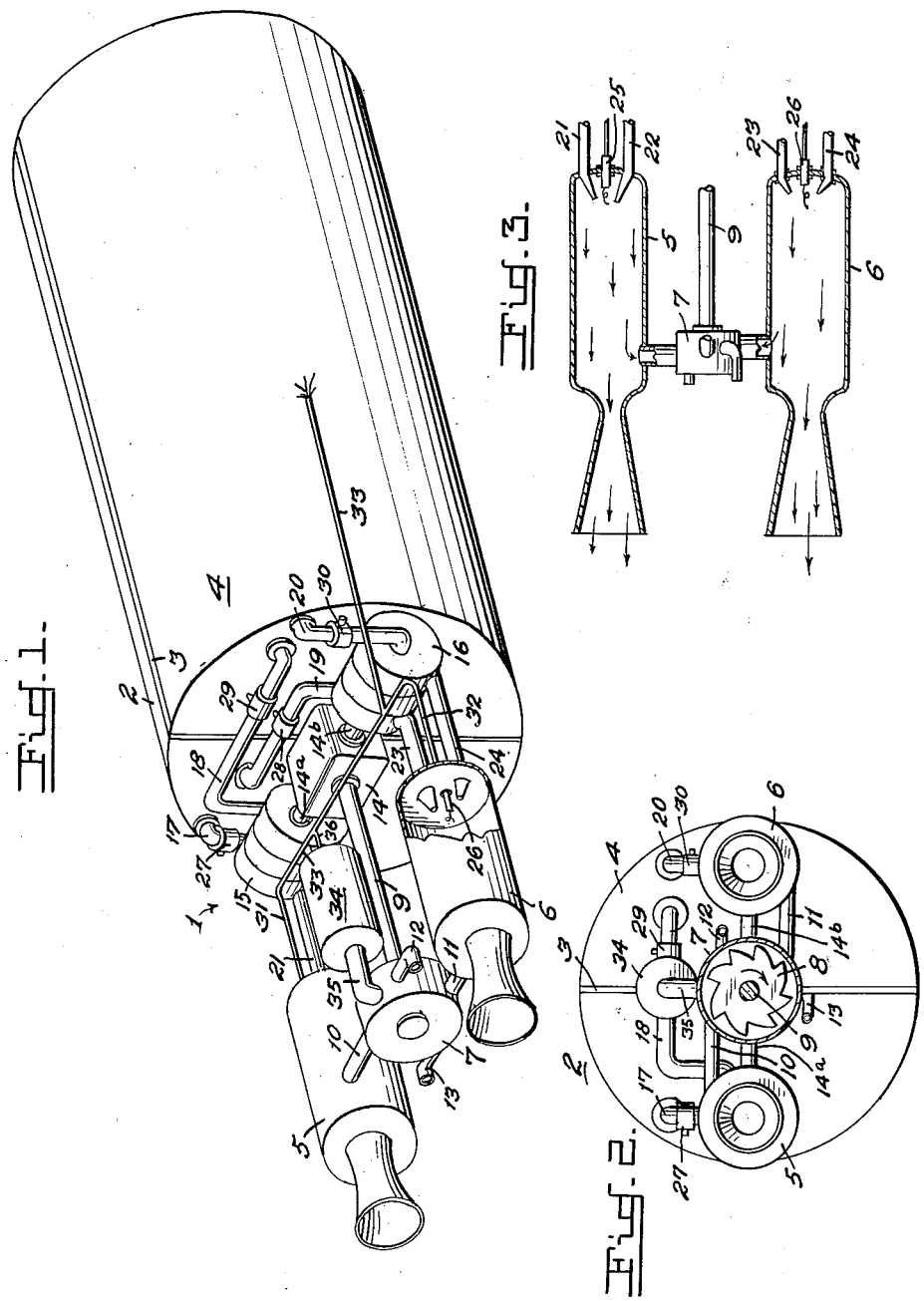

3,000,179
ROCKET ENGINE PUMP FEED SYSTEM
Adolphus Samms, Yuma Test Station, Ariz.
Filed Dec. 11, 1959, Ser. No. 859,076
1 Claim. (Cl. 60—35.6)
(Granted under Title 35, U.S. Code (1952), sec. 266)

The invention described herein may be manufactured and used by or for the Government for governmental purposes without the payment to me of any royalty thereon.

This invention relates to a rocket engine pump-feed system and more particularly to fuel pumps operated by a turbine which is, in turn, operated by combustion gases from the rocket's combustion chambers and which system will continuously supply fuel to the combustion chambers until its supply tanks are empty.

The present invention is for use in rocket engines of the type employing a pair of tanks, one containing a liquid fuel, and the other an oxidizer, as propellants of the rocket. These propellants are fed to one or more combustion chambers. Heretofore, this fuel and oxidizer were fed to the combustion chambers under high pressure. This involved an apparatus of considerable weight and complexity, which this invention is designed to eliminate, by employing a pair of centrifugal pumps operated by a turbine which, in turn, is operated by combustion gases from the rocket's combustion chambers. A small solid propellant rocket may be used to initiate the rotation of the turbine, and, as long as there is fuel in the supply tanks, the engine will continue to operate.

It is therefore a primary object of this invention to provide a rocket engine designed to function until its fuel is exhausted.

It is another object of this invention to provide a fuel feed system operated by the combustion gases from a rocket's combustion chambers.

A further object is to operate a pair of centifugal pumps by means of a turbine which in turn is operated by the gases of combustion of a rocket engine, to provide a continuous flow of fuel to the rocket engine.

It is still another object of the invention to provide a continuous supply of a fuel and an oxidizer to the combustion chambers of a rocket wherein the fuel and oxidizer are fed by centrifugal pumps operated by a turbine which is, in turn, operated by gases of combustion from the combustion chambers of the rocket, and wherein operation of the turbine is initiated by a small booster rocket.

A final object of the invention is to provide a fuel system for a rocket that is light in weight yet simple of operation.

The foregoing and other features of the invention will be better understood from the following detailed description and the accompanying drawings in which:

FIG. 1 is a perspective view with parts in section of a fuel feed system constructed in accordance with the invention;

FIG. 2 is a front view of the apparatus of FIG. 1, and

FIG. 3 is a horizontal section taken through the combustion chambers of the rocket.

Referring to the drawings, 1 represents generally the system of the invention. 2 indicates one half of a cylindrical tank in which liquid fuel may be contained. 4 indicates the other half of the tank and may contain an oxidizer. Tank valves 2 and 4 are separated by a suitable divider wall such as 3 to keep the fuels separate.

The rocket mechanism is mounted generally in an axial line of symmetry rearwardly of the tanks 2 and 4 and consists of a pair of parallel rocket combustion chambers 5 and 6. A turbine 7 is mounted between combustion chambers 5 and 6 and comprises a bucket type wheel 8 mounted on a shaft 9. Pipe lines 10 and 11 connect turbine 7 with chambers 5 and 6 respectively. Turbine 7 is provided with gas exhaust pipes 12 and 13. Shaft 9 is connected to gear transmission box 14 containing a suitable gear transmission, not shown. Centrifugal pumps 15 and 16 disposed at opposite ends of gear box 14 constitute a fuel pump and an oxidizer pump respectively and both are driven from gear transmission box 14 by axially aligned axles 14a and 14b. Pumps 15 and 16 may be of the double pump type as shown in U.S. Patent No. 2,407,852 to A. M. O. Smith, wherein a gear transmission box drives a pair of centrifugal vane pumps. Pump 15 is connected to tanks 2 and 4 by pipe lines 17 and 18 and pump 16 is connected to tanks 2 and 4 by pipe lines 19 and 20. Fuel pump 15 is connected to combustion chamber 5 by pipe lines 21 and 22 and oxidizer pump 16 is connected to combustion chamber 6 by pipe lines 23 and 24. Glow plugs 25 and 26 are provided in the forward walls of combustion chambers 5 and 6 respectively for igniting the fuel and oxidizer entering the chamber through pipe lines 21, 22, 23, and 24. Pipe lines 21 and 24 carry oxidizer and pipe lines 22 and 23 carry fuel.

To prevent fuel and oxidizer from leaking in to pipe lines 17, 18, 19, 20, 21, 23, 24, when pumps are not in operation, check valves 27 and 28 are mounted in fuel lines 17 and 19 respectively while check valves 29 and 30 are mounted in oxidizer pipe lines 18 and 20 respectively.

Electric leads 31 and 32 connect glow plugs 25 and 26 to cable 33.

A small solid propellant booster rocket 34 is mounted on exhaust pipe 35 of turbine 7. A lead 36 connects the rocket electrically through cable 33 to an electric energy source, not shown.

Operation

The starting of the apparatus is initiated by booster rocket 34 which is fired through electric lead 36. The exhaust gases will flow through pipe line 35 and impinge upon bucket wheel 8 to rotate shaft 9 which, through the transmission (not shown) in box 14 rotates axles 14a and 14b to rotate centrifugal pumps 15 and 16 which feed fuel and oxidizer from tanks 2 and 4 respectively. Each pump draws in both fuel and oxidizer in an equal amount through pipe lines 17, 18, 19 and 20 and forces the fuel and oxidizer to combustion chambers 5 and 6 through pipe lines 21, 22, and 23 where they are ignited by glow plugs 25 and 26. As long as there is fuel and oxidizer in tanks 2 and 4, the rocket will operate.

Check valves 22, 28, 29, and 30 prevent any return of either fuel or oxidizer to tanks 2 and 4.

It is apparent from the foregoing that a compact, simple method of supplying fuels to a rocket motor has been devised in that the invention has eliminated complex and heavy apparatus previously necessary to supply fuels under high pressure to the rocket motor.

Variations and modification may be effected without departing from the scope of the appended claim setting forth the novel concept of the present invention.

What is claimed is:

A rocket fuel pumping system comprising, in combination, a pair of laterally spaced combustion chambers, a propellant source for said combustion chambers, said propellant source comprising a cylindrical tank and a dividing wall therein intersecting said tank diametrically whereby said tank is divided into individual fuel containers, each forming a completely separate compartment, a pair of diametrically arranged centrifugal pumps for pumping said propellant from said compartments to said combustion chambers, a turbine connected with and disposed between said combustion chambers, said turbine being operated by the combustion gas pressure in said combustion chambers, a first pipe line system connecting said compartments and said centrifugal pumps, said first pipe ilne system comprising a pair of pipes communicating between each of said compartments and each of said pumps, and a check valve mounted on each said pipe, a second pipe line system connecting said centrifugal pumps and said combustion chambers, said second pipe line system comprising a pair of uninterrupted pipes communicating, between each of said centrifugal pumps and each of said combustion chambers, a booster rocket connected to said turbine, said booster rocket being adapted to initiate rotation of said turbine, transmission means connecting said turbine and said centrifugal pumps, said transmission means comprising a first shaft connected at one end to said turbine, a transmission unit connected to the other end of said first shaft and a pair of axially aligned axles normal to said first shaft connecting said transmission unit and each of said centrifugal pumps, and an electrical firing means connected to said combustion chambers and said booster rocket comprising an electrical lead connected to each said combustion chamber and said booster rocket, and a glow plug mounted in each of said combustion chambers and in connection with the aforesaid electrical lead.

References Cited in the file of this patent
UNITED STATES PATENTS

| | | |
|---|---|---|
| 2,394,852 | Goddard | Feb. 12, 1946 |
| 2,402,826 | Lubbock | June 25, 1946 |
| 2,450,950 | Goddard | Oct. 12, 1948 |
| 2,479,888 | Wyld et al. | Aug. 23, 1949 |
| 2,585,626 | Chilton | Feb. 12, 1952 |
| 2,673,445 | Bruckmann | Mar. 30, 1954 |
| 2,683,963 | Chandler | July 20, 1954 |

FOREIGN PATENTS

| | | |
|---|---|---|
| 269,183 | Italy | Nov. 12, 1929 |
| 719,946 | Great Britain | Dec. 8, 1954 |